(12) United States Patent
    Park

(10) Patent No.:     US 12,626,961 B2
(45) Date of Patent:       May 12, 2026

(54) BATTERY PACK

(71) Applicant: SAMSUNG SDI CO., LTD., Yongin-si (KR)

(72) Inventor: Sanghun Park, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 531 days.

(21) Appl. No.: 18/206,709

(22) Filed: Jun. 7, 2023

(65) Prior Publication Data

US 2023/0402662 A1     Dec. 14, 2023

(30) Foreign Application Priority Data

Jun. 8, 2022     (KR) ........................ 10-2022-0069549

(51) Int. Cl.
    H01R 4/28          (2006.01)
    H01M 10/42        (2006.01)
        (Continued)
(52) U.S. Cl.
    CPC ....... H01M 10/425 (2013.01); H01M 10/653 (2015.04); H01M 50/102 (2021.01); H01M 50/503 (2021.01)
(58) Field of Classification Search
    CPC ............. H01M 10/425; H01M 10/653; H01M 50/102; H01M 50/503; H01M 50/519;
        (Continued)

(56) References Cited

U.S. PATENT DOCUMENTS

| | | | | |
|---|---|---|---|---|
| 2012/0190252 A1* | 7/2012 | Pavlinsky | ........... | H01M 10/425 |
| | | | | 439/775 |
| 2012/0214027 A1* | 8/2012 | Ahn | .................... | H01M 10/425 |
| | | | | 429/7 |

(Continued)

FOREIGN PATENT DOCUMENTS

| | | | |
|---|---|---|---|
| JP | 2014-90155 A | 5/2014 |
| KR | 10-2008-0106499 A | 12/2008 |

(Continued)

OTHER PUBLICATIONS

Korean Office Action dated Nov. 11, 2024, of the corresponding KR Patent Application No. 10-2022-0069549.

*Primary Examiner* — Abdullah A Riyami
*Assistant Examiner* — Nelson R. Burgos-Guntin
(74) *Attorney, Agent, or Firm* — Lee IP Law, P.C.

(57)          ABSTRACT

A battery pack includes a battery cell; a main circuit board electrically connected to the battery cell; a flexible circuit board connected to the main circuit board and having an external connection terminal; a conductive compression layer between a first connection portion of the main circuit board and a second connection portion of the flexible circuit board, the conductive compression layer electrically connecting the first and second connection portion to each other, and including conductive particles and an insulating resin accommodating the conductive particles, wherein the first connection portion of the main circuit board includes a first insulating layer, first connection pads protruding from the first insulating layer, and accommodation spaces on the first insulating layer, between adjacent ones of the first connection pads and accommodating the insulating resin, and the second connection portion of the flexible circuit board includes second connection pads electrically connected to the first connection pads.

17 Claims, 7 Drawing Sheets

(51) Int. Cl.
H01M 10/653 (2014.01)
H01M 50/102 (2021.01)
H01M 50/503 (2021.01)

(58) Field of Classification Search
CPC ............ H01M 50/284; H01M 50/202; H01M 50/569; Y02E 60/10
See application file for complete search history.

(56) References Cited

U.S. PATENT DOCUMENTS

| | | | | |
|---|---|---|---|---|
| 2012/0276419 A1* | 11/2012 | Park | .................... | H01M 50/211 |
| | | | | 429/7 |
| 2013/0115481 A1* | 5/2013 | Kim | .................... | H01M 50/15 |
| | | | | 429/7 |
| 2014/0147706 A1* | 5/2014 | Choi | .................. | H01M 50/566 |
| | | | | 361/728 |
| 2015/0155545 A1* | 6/2015 | Baek | ................. | H01M 10/4257 |
| | | | | 429/7 |
| 2015/0340662 A1* | 11/2015 | Kwon | ................. | H01M 50/105 |
| | | | | 429/94 |
| 2016/0164146 A1* | 6/2016 | Na | .......................... | H01L 24/48 |
| | | | | 257/676 |
| 2019/0244904 A1 | 8/2019 | Kim et al. | | |
| 2020/0144677 A1* | 5/2020 | Choi | ................... | H01M 50/574 |
| 2021/0104799 A1* | 4/2021 | Choi | ................. | H01M 50/121 |
| 2021/0203031 A1* | 7/2021 | Park | .................... | H01M 50/543 |
| 2021/0351481 A1* | 11/2021 | Lee | .................... | H01M 50/284 |

FOREIGN PATENT DOCUMENTS

| | | | |
|---|---|---|---|
| KR | 10-2012-0122860 A | 11/2012 | |
| KR | 10-2017-0084406 A | 7/2017 | |
| KR | 10-2020-0016638 A | 2/2020 | |
| KR | 10-2021-0011881 A | 2/2021 | |

* cited by examiner

FIG. 2

BATTERY PACK

CROSS-REFERENCE TO RELATED APPLICATION

This application is based on and claims priority under 35 U.S.C. § 119 to Korean Patent Application No. 10-2022-0069549, filed on Jun. 8, 2022, in the Korean Intellectual Property Office, the disclosure of which is incorporated by reference herein in its entirety.

BACKGROUND

1. Field

Embodiments relate to a battery pack.

2. Description of the Related Art

In general, secondary batteries are rechargeable unlike non-rechargeable primary batteries. Secondary batteries may be used as energy sources of devices, such as mobile devices, electric vehicles, hybrid vehicles, electric bicycles, and uninterruptible power supplies, and depending on the type of an external device using a secondary battery, the secondary battery may be used as a single battery cell or as a module in which a plurality of battery cells are connected to each other to constitute a unit.

SUMMARY

The embodiments may be realized by providing a battery pack including a battery cell; a main circuit board electrically connected to the battery cell; a flexible circuit board connected to the main circuit board and having an external connection terminal therein; a conductive compression layer between a first connection portion of the main circuit board and a second connection portion of the flexible circuit board, the conductive compression layer electrically connecting the first connection portion and the second connection portion to each other, and including a plurality of conductive particles and an insulating resin accommodating the plurality of conductive particles, wherein the first connection portion of the main circuit board includes a first insulating layer, first connection pads protruding from the first insulating layer, and accommodation spaces on the first insulating layer, the accommodation spaces being between adjacent ones of the first connection pads and accommodating the insulating resin, and the second connection portion of the flexible circuit board includes second connection pads electrically connected to the first connection pads.

The first connection pads may be arranged in a first direction in which the main circuit board extends and arranged in a second direction intersecting the first direction, and the accommodation spaces may have a channel shape extending in the first direction and the second direction between adjacent ones of the first connection pads.

The accommodation spaces may be open toward an outside of the first connection portion.

Each of the first connection pads may be surrounded by the accommodation spaces and isolated from other adjacent first connection pads.

The first connection pads may protrude from the first insulating layer in a third direction intersecting the first direction and the second direction, and the accommodation spaces may be on the first insulating layer.

The first connection pads, the second connection pads, and the conductive compression layer electrically connecting the first connection pads and the second connection pads to each other may be between a surface of the main circuit board opposite to the first connection pads and a surface of the flexible circuit board opposite to the second connection pads.

The surface of the flexible circuit board may be electrically insulating.

The first connection pads may protrude above the first insulating layer and penetrate the first insulating layer.

The first connection pads may have a uniform thickness protruding from the first insulating layer.

The first insulating layer may have a flat surface across the first connection pads.

The first insulating layer may form a flat outer surface of the main circuit board in a third direction intersecting the first direction in which the main circuit board extends, extends from a position outside the first connection portion in the main circuit board, and is locally exposed in the first connection portion.

The second connection pads may be recessed from a second insulating layer in the second connection portion.

The second connection pads may be recessed from the second insulating layer by a depth corresponding to a thickness of the second insulating layer, and a depth of the second connection pads may provide a locking step for capturing the plurality of conductive particles between the first connection pads and the second connection pads.

The second connection pads may be exposed through openings of the second insulating layer.

The main circuit board and the flexible circuit board overlap each other at the first connection portion and the second connection portion in a first direction, and extend side by side with each other in the first direction, and the first connection pads and the second connection pads, in the first connection portion and the second connection portion, may be arranged in the first direction and a second direction intersecting the first direction.

Among relative proportions of the plurality of conductive particles and the insulating resin of the conductive compression layer, a relative proportion of the plurality of conductive particles between the first connection pads and the second connection pads in the first connection portion and the second connection portion, respectively, may be greater than a relative proportion of the plurality of conductive particles in the accommodation spaces.

Among relative proportions of the plurality of conductive particles and the insulating resin of the conductive compression layer, a relative proportion of the insulating resin in the accommodation spaces may be greater than a relative proportion of the insulating resin between the first connection pads and the second connection pads in the first connection portion and the second connection portion, respectively.

BRIEF DESCRIPTION OF THE DRAWINGS

Features will be apparent to those of skill in the art by describing in detail exemplary embodiments with reference to the attached drawings in which:

FIG. 2 is a perspective view illustrating an electrical connection between first and second connection portions of a main circuit board and a flexible circuit board, as part of the battery pack illustrated in FIG. 1;

DETAILED DESCRIPTION

Figure 1:
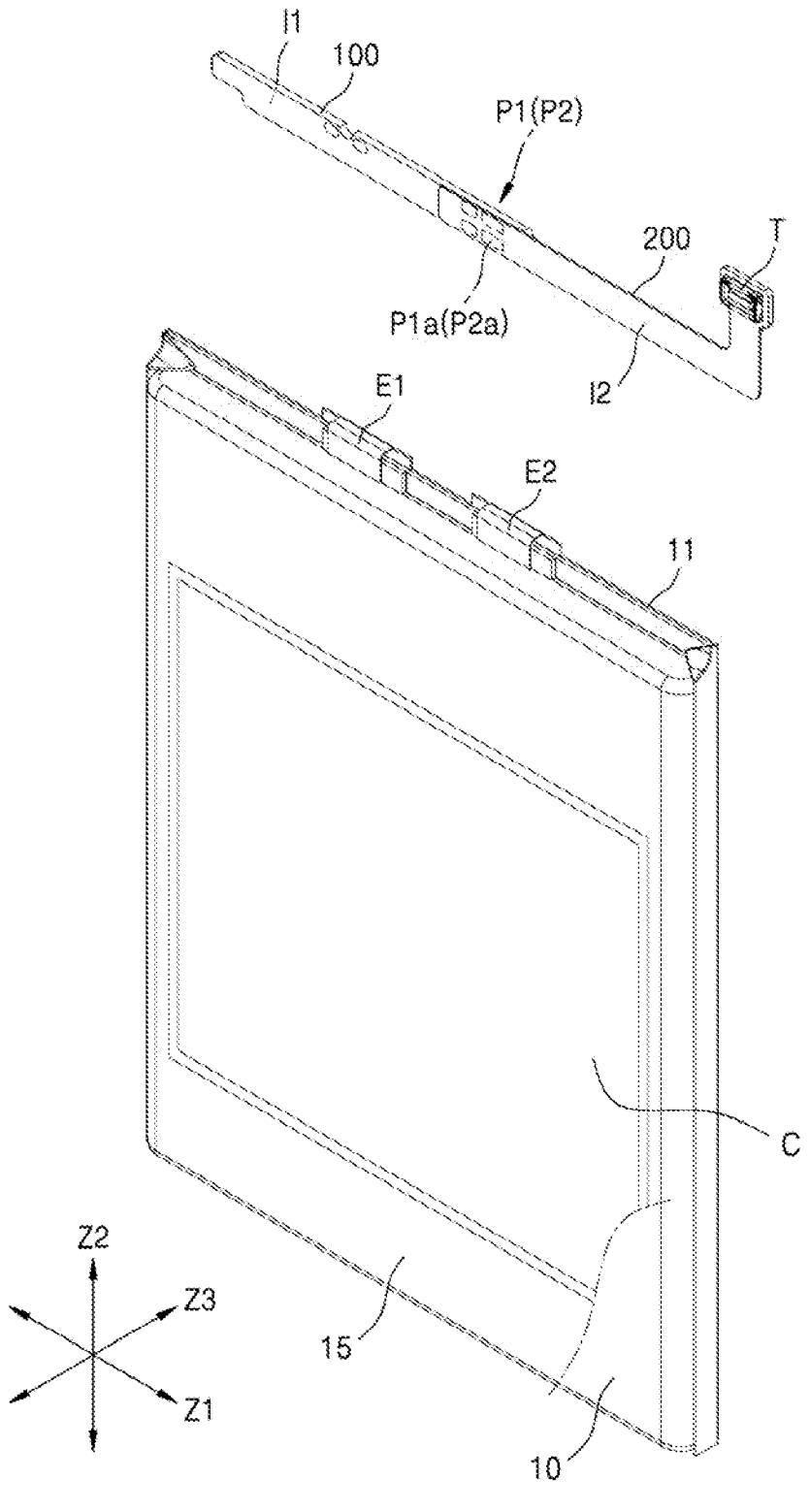
FIG. 1 is an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening layers may also be present. In addition, it will also be understood that when a layer is referred to as being "between" two layers, it can be the only layer between the two layers, or one or more intervening layers may also be present. Like reference numerals refer to like elements throughout.

Expressions such as "at least one of," when preceding a list of elements, modify the entire list of elements and do not modify the individual elements of the list.

Hereinafter, a battery pack according to an embodiment will be described with reference to the accompanying drawings.

Figure 2:
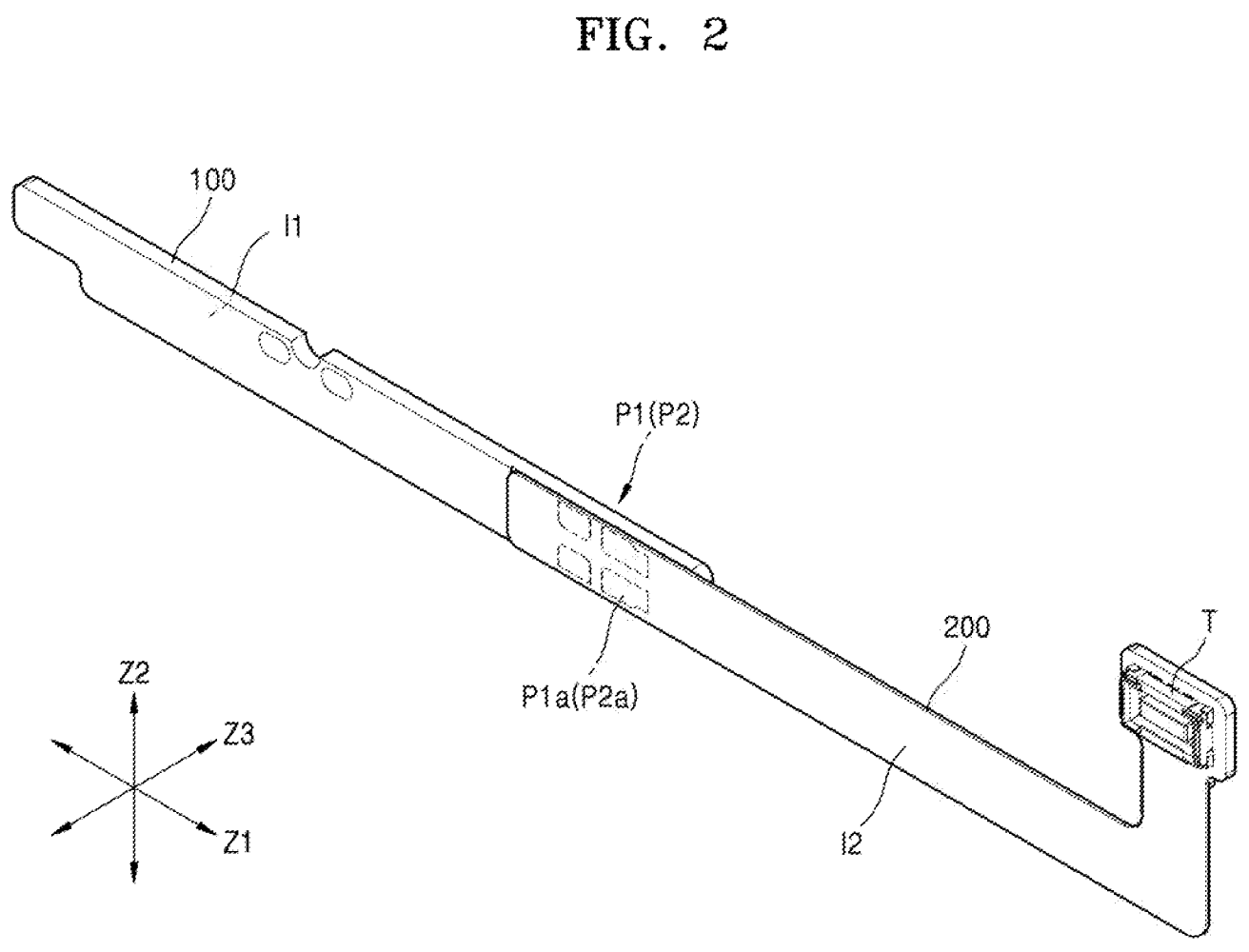
Figure 3:
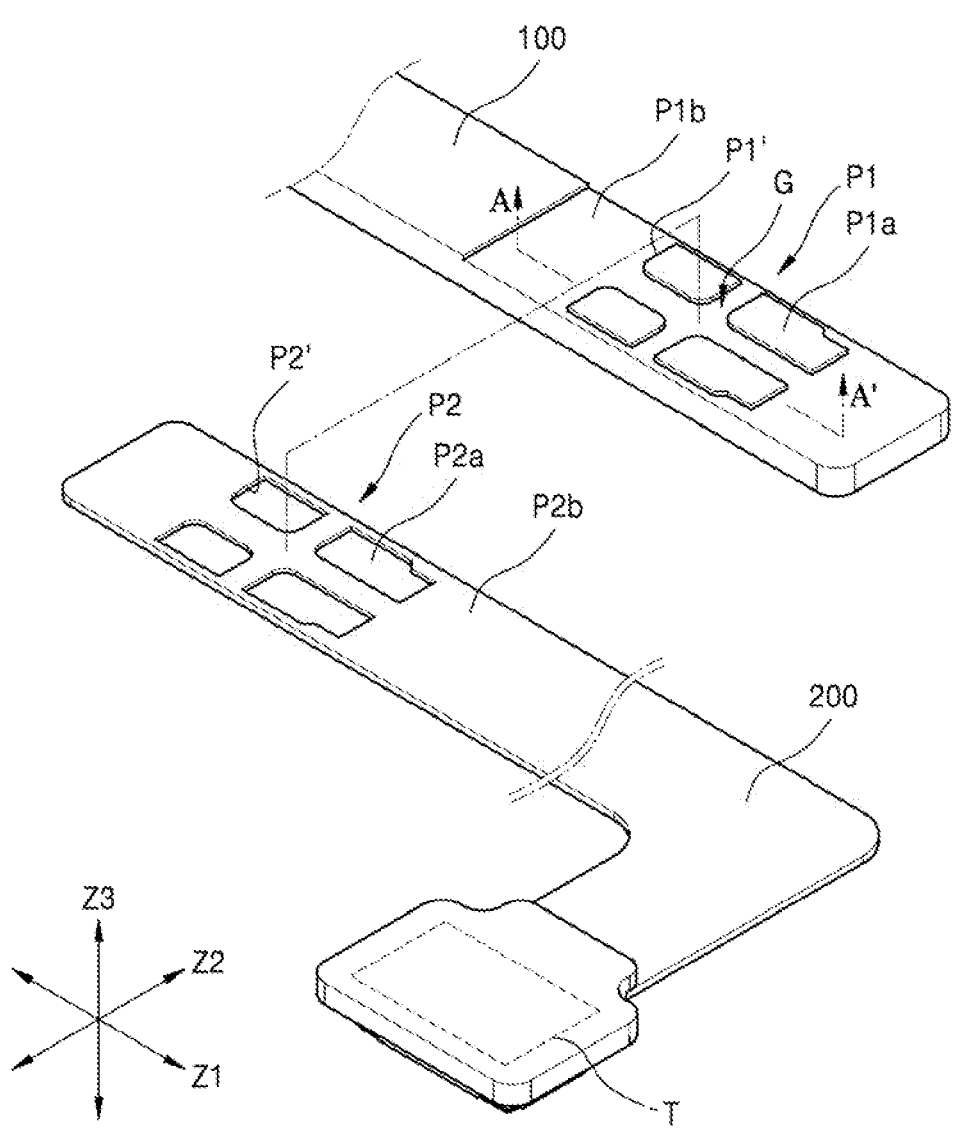
FIG. 3 is a perspective view illustrating structures of first and second connection pads on the first and second connection portions of the main circuit board and the flexible circuit board illustrated in FIG. 2.
Figure 4A:
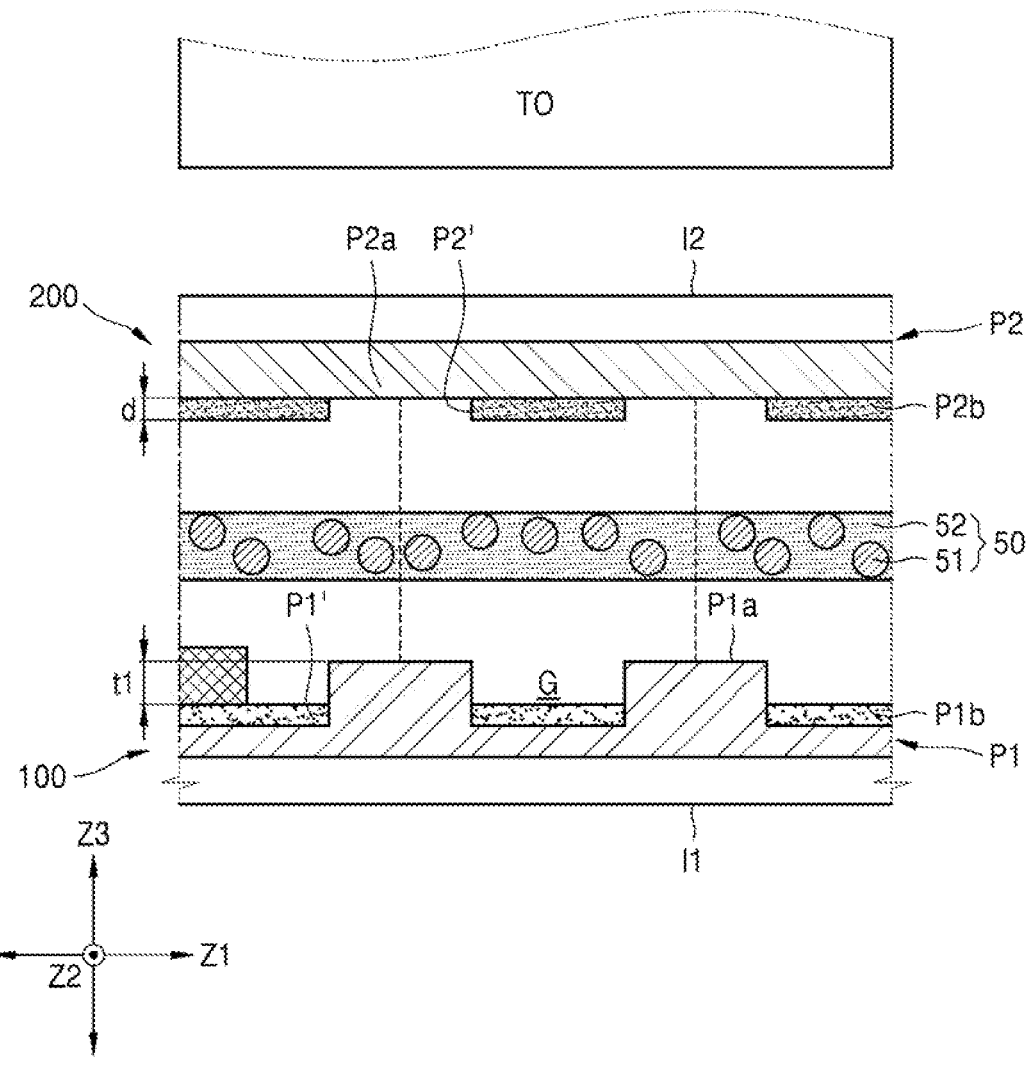
FIGS. 4A and 4B are cross-sectional views taken along line A-A' of FIG. 3, for describing an electrical connection between the first and second connection portions with a conductive compression layer between the main circuit board and the flexible circuit board.
Figure 4B:
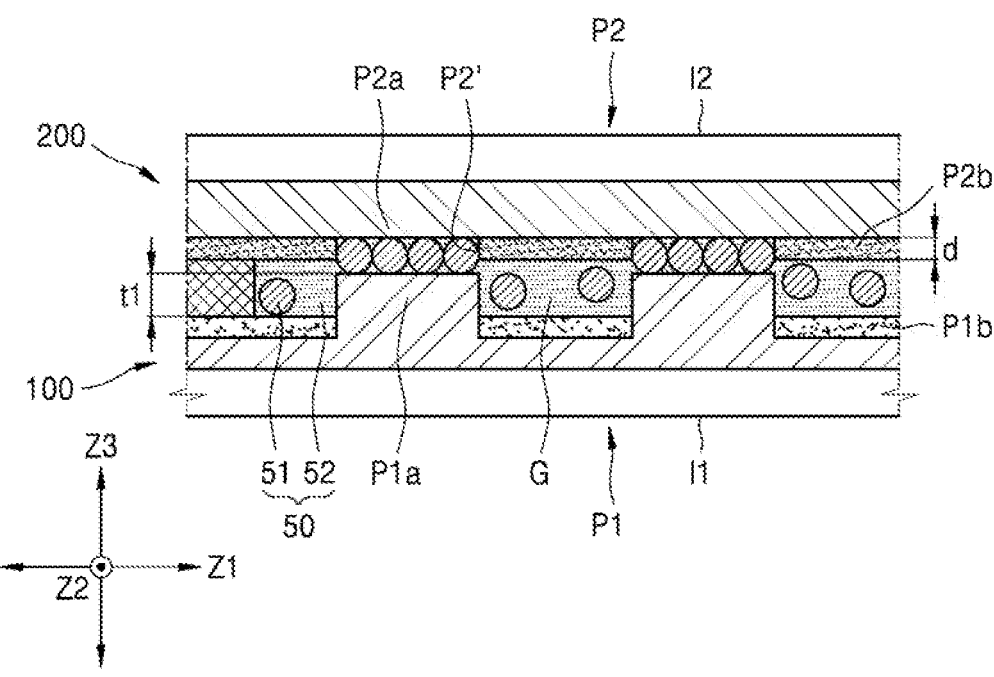
Figure 5:
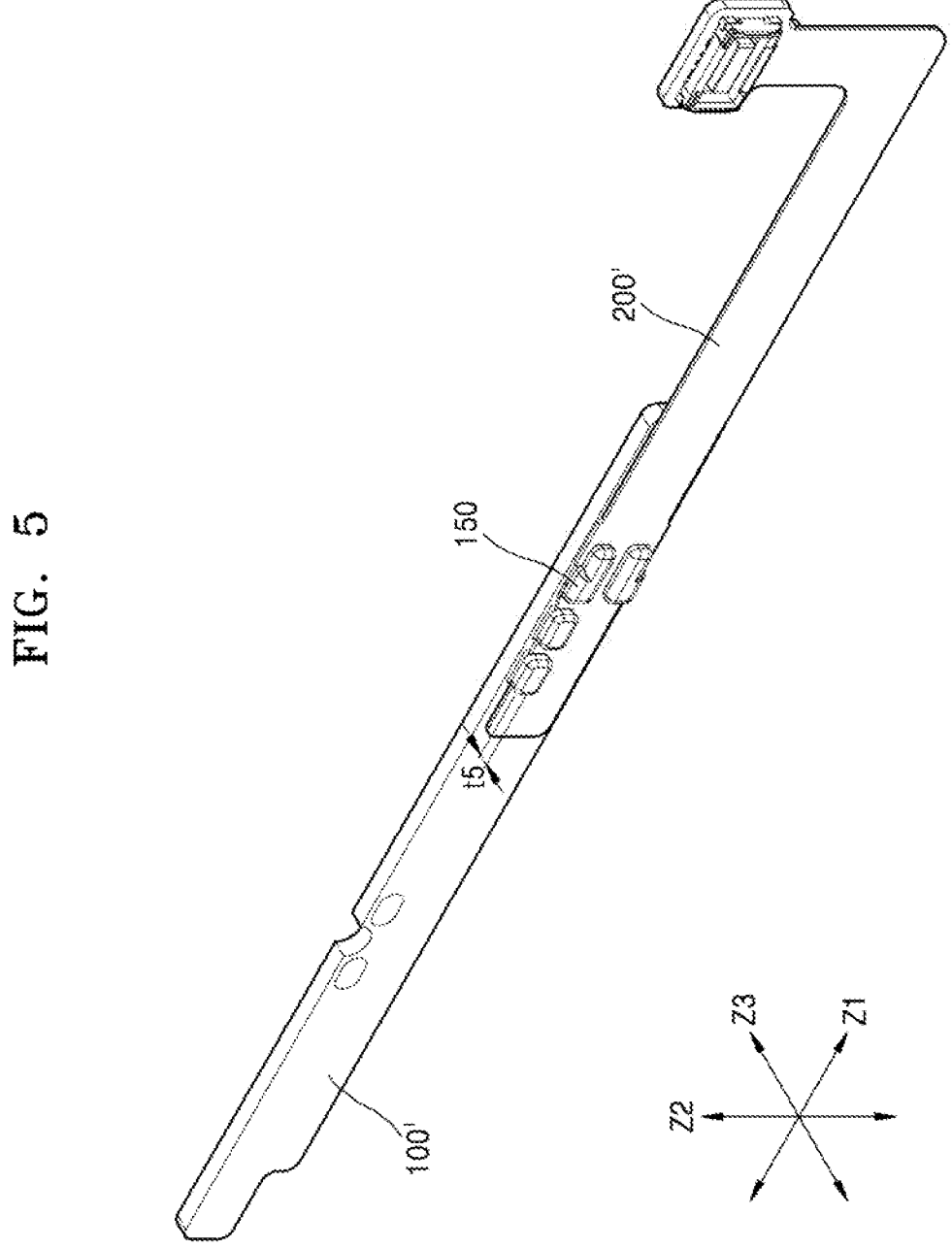
FIGS. 5 and 6 are diagrams illustrating comparative examples, including different perspective views illustrating electrical connections between a main circuit board and a flexible circuit board.
Figure 6:
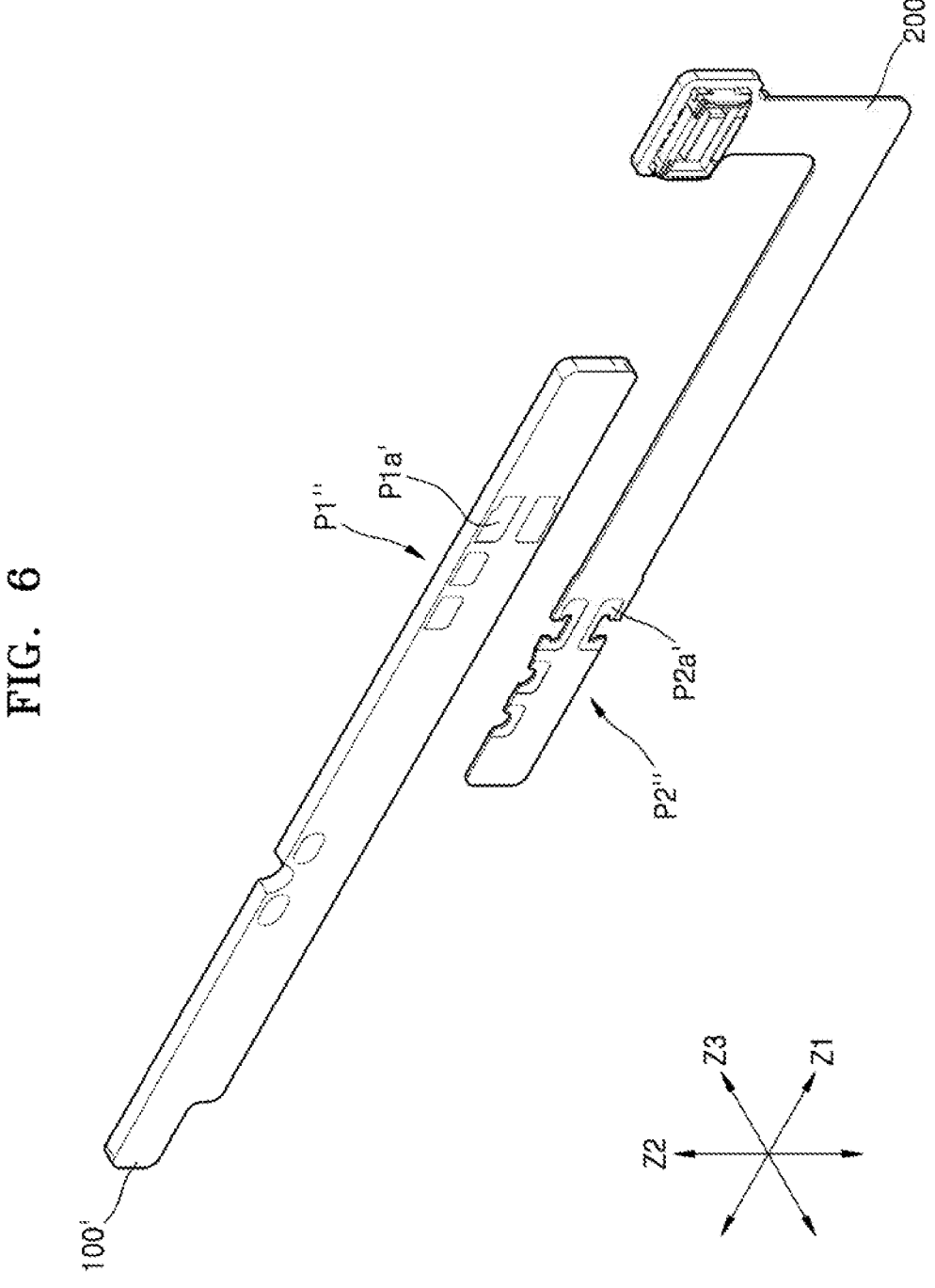

FIG. 1 is an exploded perspective view of a battery pack according to an embodiment. FIG. 2 is a perspective view illustrating an electrical connection between first and second connection portions P1 and P2 of a main circuit board 100 and a flexible circuit board 200, as part of the battery pack illustrated in FIG. 1. FIG. 3 is a perspective view illustrating structures of first and second connection pads P1*a* and P2*a* on the first and second connection portions P1 and P2 of the main circuit board 100 and the flexible circuit board 200 illustrated in FIG. 2. FIGS. 4A and 4B are cross-sectional views taken along line A-A' of FIG. 3, for describing an electrical connection between the first and second connection portions P1 and P2 with a conductive compression layer 50 between the main circuit board 100 and the flexible circuit board 200. FIGS. 5 and 6 are diagrams illustrating comparative examples, including different perspective views illustrating electrical connections between the main circuit board 100 and the flexible circuit board 200.

Referring to FIGS. 1 to 4B, a battery pack according to an embodiment may include a battery cell C, the main circuit board 100 electrically connected to the battery cell C and extending (e.g., lengthwise) in a first direction Z1, and the flexible circuit board 200 extending parallel to the main circuit board 100 in the first direction Z1 and including an external connection terminal T at a position outside the main circuit board 100. The main circuit board 100 and the flexible circuit board 200 may include the first and second connection portions P1 and P2, respectively, which are coupled to each other to overlap each other and are arranged in the first direction Z1. The connection portions may include a first connection portion P1 on the main circuit board 100 and a second connection portion P2 on the flexible circuit board 200.

The battery cell C may include an electrode assembly 10, and a casing 15 that seals the electrode assembly 10 together with an electrolyte and may include a terrace portion 11 from which first and second electrodes E1 and E2 electrically connected to the electrode assembly 10 are drawn out. As will be described below, the main circuit board 100 electrically connected to the first and second electrodes E1 and E2 may be on the terrace portion 11.

In an implementation, the electrode assembly 10 may include first and second electrode plates having different polarities, and a separator between the first and second electrode plates, and the electrode assembly 10 may have a roll shape by winding the first and second electrode plates with the separator therebetween, or a stack shape by stacking a plurality of first and second electrode plates with separators therebetween.

The main circuit board 100, to which the first and second electrodes E1 and E2 are connected, may be on the terrace portion 11 from which the first and second electrodes E1 and E2 of the battery cell C are drawn out. Charge and discharge currents of the battery cell C may flow, via the main circuit board 100 connected to the first and second electrodes E1 and E2, to the external connection terminal T of the flexible circuit board 200, which is connected side by side to the main circuit board 100.

The main circuit board 100 may be electrically connected to the battery cell C, and may be connected to the first and second electrodes E1 and E2 of the battery cell C to form the charge and discharge paths of the battery cell C. The main circuit board 100 may be electrically connected to the flexible circuit board 200 including the external connection terminal T thereon, and may form the charge and discharge paths between the battery cell C and the external connection terminal T of the flexible circuit board 200. The main circuit board 100 may be on the terrace portion 11 of the battery cell C from which the first and second electrodes E1 and E2 are drawn out, and may extend in the first direction Z1 parallel to the terrace portion 11. As will be described below, the flexible circuit board 200 electrically connected to the main circuit board 100 may also extend in the first direction Z1 parallel to the main circuit board 100. For reference, throughout the specification, the first direction Z1 may refer to a longitudinal direction of the main circuit board 100 and the flexible circuit board 200, e.g., a direction from the main circuit board 100 toward the flexible circuit board 200. In addition, throughout the specification, a second direction Z2 may refer to a width direction of the main circuit board 100 and the flexible circuit board 200, or a direction intersecting the first direction Z1, e.g., a direction perpendicular to the first direction Z1. In an implementation, a third direction Z3 may refer to a stacking direction in which the main circuit board 100 and the flexible circuit board 200 are stacked with respect to each other, and, as will be described below, may refer to a stacking direction in which the first and second connection portions P1 and P2 of the main circuit board 100 and the flexible circuit board 200 are stacked with respect to each other, or may refer to a stacking direction in which the first and second connection portions P1 and P2 of the main circuit board 100 and the flexible circuit board 200 are stacked with respect to each other with the conductive compression layer 50 therebetween, or a compression direction in which the first and second connection portions P1 and P2 with the conductive compression layer 50 therebetween are thermally compressed toward each other.

Unlike the flexible circuit board 200, the main circuit board 100 may be a relatively rigid circuit board, and in order to form the charge and discharge paths between the battery cell C and the flexible circuit board 200 and control charging and discharging operations of the battery cell C in response to an abnormal situation such as overheating, overcharging, and overdischarging of the battery cell C, a plurality of circuit elements may be on the main circuit board 100. In an implementation, the main circuit board 100 may function as a battery management system (BMS) to monitor state information such as temperature, voltage, and current of the battery cell C, capture an abnormal situation, and take protective measures such as stopping the charging and discharging operations. In an implementation, unlike the flexible circuit board 200, the main circuit board 100 may be a relatively rigid circuit board, or the main circuit board 100 may be a flexible film-type circuit board like the flexible circuit board 200.

The flexible circuit board 200 may extend side by side with the main circuit board 100 in the first direction Z1. The electrical connection between the main circuit board 100 and the flexible circuit board 200 may be made by electrically connecting the first and second connection portions P1 and P2 on the main circuit board 100 and the flexible circuit board 200, respectively, to each other. In an implementation, the first connection portion P1 on the main circuit board 100 and the second connection portion P2 on the flexible circuit board 200 may be electrically connected to each other with the conductive compression layer 50 between the first and second connection portions P1 and P2. In an implementation, the first and second connection portions P1 and P2 may be electrically connected to each other by performing thermocompression bonding on the first and second connection portions P1 and P2 with the conductive compression layer 50 therebetween.

The first connection portion P1 on the main circuit board 100 and the second connection portion P2 on the flexible circuit board 200 may overlap each other at positions corresponding to each other, and accordingly, the positions of the first and second connection portions P1 and P2 may be collectively referred to as the positions of the connection portions P1 and P2. In an implementation, the first connection portion P1 of the main circuit board 100 and the second connection portion P2 of the flexible circuit board 200 may have different shapes.

Referring to FIGS. 4A and 4B, in an embodiment, the electrical connection between the main circuit board 100 and the flexible circuit board 200 may be made through the conductive compression layer 50 between the main circuit board 100 and the flexible circuit board 200. The conductive compression layer 50 may include a plurality of conductive particles 51 between the first and second connection portions P1 and P2 of the main circuit board 100 and the flexible circuit board 200 to mediate the electrical connection therebetween, and an insulating resin 52, which accommodates the plurality of conductive particles 51, and is in a solid phase without fluidity at room temperature below a transition temperature, and then transitions to a liquid or a gel phase above the transition temperature, thereby providing fluidity to the plurality of conductive particles 51.

In an implementation, the conductive compression layer 50 may refer to a component that is not conductive before the thermocompression bonding, and then becomes conductive through the thermocompression bonding, and may refer to a component capable of making a difference in conductivity between before and after the thermocompression bonding, which is different from metal members that may be recognized as conductive materials regardless of thermocompression bonding. In an implementation, the conductive compression layer 50 may become conductive only through a transition from a non-conductive state (or an insulating state) before the thermocompression bonding to a conductive state after the thermocompression bonding (a conductivity transition of the conductive compression layer 50), and thus form the electrical connection between the first and second connection portions P1 and P2 of the main circuit board 100 and the flexible circuit board 200. The first connection portion P1 of the main circuit board 100 and the second connection portion P2 of the flexible circuit board 200 may be configured to support the conductivity transition of the conductive compression layer 50 such that the conductivity transition of the conductive compression layer 50 between the first connection portion P1 of the main circuit board 100 and the second connection portion P2 of the flexible circuit board 200 is smoothly performed, e.g., such that the first and second connection portions P1 and P2 of the main circuit board 100 and the flexible circuit board 200 are electrically connected to each other with high reliability through the conductivity transition of the conductive compression layer 50.

The first connection portion P1 of the main circuit board 100 may include a plurality of first connection pads P1a spaced apart from each other, and accommodation spaces G on a first insulating layer P1b between the first connection pads P1a adjacent to each other among the plurality of first connection pads P1a. The plurality of first connection pads P1a and the first insulating layer P1b may be at different levels in the third direction Z3. In an implementation, the plurality of first connection pads P1a and the first insulating layer P1b may be at different levels in the third direction Z3, e.g., the insulating resin 52, which may become fluid through the thermocompression bonding, may flow into the accommodation spaces G at a relatively low level, and the plurality of conductive particles 51, which have lost the fluidity as the insulating resin 52 flows, may remain on the first connection pad P1a at a relatively high level, and thus form an electrical connection with the second connection pad P2a on the second connection portion P2.

In an implementation, the configuration in which the first connection pad P1a and the first insulating layer P1b of the first connection portion P1 are at different levels in the third direction Z3 is to allow the insulating resin 52, which may become fluid through the thermocompression bonding, to move to the accommodation spaces G at a relatively low level, e.g., to the accommodation spaces G on the first insulating layer P1b, such that the insulating resin 52 may be discharged from the first connection pad P1a at a relatively high level, and the conductive particles 51, which have lost the fluidity as the insulating resin 52 is discharged, may remain on the first connection pad P1a and thus form a conductive connection with the second connection pad P2a of the second connection portion P2. In an implementation, as thermocompression bonding is performed on the conductive compression layer 50, e.g., by arranging the conductive compression layer 50 between the main circuit board 100 on which the first connection pad P1a is formed and the flexible circuit board 200 on which the second connection pad P2a is formed and then supplying certain heat while compressing the main circuit board 100 and the flexible circuit board 200 toward each other, the insulating resin 52, which has relatively excellent fluidity, may flow from the first connection pad P1*a* to which a relatively high compression pressure acts, to the accommodation spaces G on the first insulating layer P1*b* to which a relatively low compression pressure acts. In an implementation, by providing the accommodation spaces G between the first connection pads P1*a* adjacent to each other, the insulating resin 52 discharged from the first connection pads P1*a* may be immediately received without delay at positions adjacent to the first connection pads P1*a*, and by promoting or facilitating discharge of the insulating resin 52 from the first connection pad P1*a*, the conductive contact between the first connection pads P1*a* and the second connection pads P2*a* may be prevented from being hindered by the insulating resin 52 that could be excessively present together with the conductive particles 51 on the first connection pads P1*a*.

In an implementation, depending on the components constituting the conductive compression layer 50, the conductive particles 51 may be present at a relatively high density between the first and second connection pads P1*a* and P2*a*, and the insulating resin 52 may be present at a relatively high density in the accommodation spaces G outside the space between the first and second connection pads P1*a* and P2*a*. In an implementation, the conductive particles 51 and the insulating resin 52 being present in a high proportion may mean that the relative proportions of the conductive particles 51 and the insulating resin 52 at any one of a region between the first and second connection pads P1*a* and P2*a* and regions within the accommodation spaces G are greater than those at other regions. In an implementation, in the relative proportions of the conductive particles 51 of the conductive compression layer 50 and the insulating resin 52, the relative proportion of the conductive particles 51 between the first and second connection pads P1*a* and P2*a* may be greater than the relative proportion of the conductive particles 51 in the accommodation space G. In an implementation, in the relative proportions of the conductive particles 51 and the insulating resin 52 of the conductive compression layer 50, the relative proportion of the insulating resin 52 in the accommodation spaces G may be greater than the relative proportion of the insulating resin 52 between the first and second connection pads P1*a* and P2*a*.

In an implementation, when compared with the average of the relative proportions of the conductive compression layer 50, the conductive particles 51 may be between the first and second connection pads P1*a* and P2*a* in a relative proportion greater than the average, and the insulating resin 52 may be in the accommodation spaces G in a relative proportion greater than the average.

In an implementation, the first connection pad P1*a* may include a plurality of first connection pads P1*a* spaced apart from each other in the first and second directions Z1 and Z2. In an implementation, the first connection pads P1*a* may be at an equal level in the third direction Z3, and the accommodation spaces G may be between the first connection pads P1*a* adjacent to each other. In an implementation, the accommodation spaces G having a channel shape in the first and second directions Z1 and Z2 may be between the first connection pads P1*a* adjacent to each other among the plurality of first connection pads P1*a*. In an implementation, the accommodation spaces G may include an accommodation space G extending in a channel shape in the first direction Z1 and an accommodation space G extending in a channel shape in the second direction Z2, and the accommodation spaces G may extend across the first insulating layer P1*b* that provides a base of the first connection portion P1 in the first and second directions Z1 and Z2 and thus provide a space open toward the outside of the first connection portion P1. In an implementation, the accommodation space G refers to a space on the first insulating layer P1*b* to accommodate the insulating resin 52 on the first connection pad P1*a*, which protrudes to or has a certain thickness t1 from the first insulating layer P1*b* that provides the base of the first connection portion P1, e.g., may be a space open toward the outside of the first connection portion P1 rather than as a closed space, and accordingly, the volume of the insulating resin 52 accommodated therein may not be limited.

Referring to FIGS. 3 to 4B together, in an embodiment, each of the first connection pads P1*a* may be surrounded by the accommodation spaces G having the shape of a channel extending in the first and second directions Z1 and Z2, and accordingly, each of the first connection pads P1*a* may be isolated by the channel-shaped accommodation spaces G extending in the first and second directions Z1 and Z2, and each first connection pad P1*a* may be isolated form from the other adjacent first connection pads P1*a*.

In an implementation, each of the first connection pads P1*a* being isolated may mean that that the first connection pads P1*a* (e.g., protruding portions of the first connection portion P1) adjacent to each other in the first and second directions Z1 and Z2 may be disconnected from each other by the accommodation spaces G and thus may not be connected to each other. In an implementation, the first connection pads P1*a* spaced apart from each other along the first and second directions Z1 and Z2 may form a 2×2 array, and each of the first connection pad P1*a* may be surrounded by the channel-shaped accommodation spaces G formed in the first and second directions Z1 and Z2, and thus isolated and disconnected from each other. In an implementation, each of the first connection pads P1*a* being surrounded by the channel-shaped accommodation spaces G formed in the first and second directions Z1 and Z2 may mean that each of the first connection pads P1*a* may be adjacent to the accommodation spaces G on both sides in the first direction Z1 and adjacent to the accommodation spaces G on both sides in the second direction Z2. In an implementation, each of the first connection pads P1*a* may be surrounded by the channel-shaped accommodation spaces G in the first and second directions Z1 and Z2, and thus, even in a case in which the insulating resin 52 discharged from above each of the first connection pads P1*a* is discharged in an arbitrary direction, the discharged insulating resin 52 may be accommodated by the accommodation spaces G surrounding the first connection pads P1*a*.

In an implementation, the accommodation spaces G may be on the first insulating layer P1*b*. In an implementation, the first insulating layer P1*b* may be locally exposed on the first connection portion P1 of the main circuit board 100, and may extend from another part of the main circuit board 100, e.g., a part outside the first connection portion P1. In an implementation, the first insulating layer P1*b* may be selectively exposed only in the first connection portion P1 of the main circuit board 100, e.g., the main circuit board 100 may include an insulating cover extending in the first direction Z1 to cover most of the main circuit board 100 other than the first connection portion P1, and the insulating cover of the main circuit board 100 may be terminated before the first connection portion P1 at one end of the main circuit board 100 such that the first insulating layer P1*b* of the first connection portion P1 may be exposed from or by the insulating cover.

In an implementation, the first insulating layer P1*b* may exclude electrical interference by the conductive particles 51 in the accommodation spaces G, e.g., electrical interference with the main circuit board 100 (e.g., malfunction due to an unintentional electrical connection with the main circuit board 100), and uniformly maintain the depth of the accommodation spaces G surrounding the plurality of first connection pads P1*a*. In an implementation, the accommodation spaces G may form a uniform depth from the first connection pads P1*a*. In an implementation, the first insulating layer P1*b* may include a relatively hard insulating material so as to form a uniform level in the third direction Z3, and the main circuit board 100 may be formed such that the relatively hard insulating material is exposed at the first connection portion P1. In an implementation, the first insulating layer P1*b* may be at a uniform level, e.g., the first insulating layer P1*b* may have a flat surface in the third direction Z3, in order to help exclude or prevent electrical interference by the conductive particles 51 in the accommodation spaces G and to form, at a uniform depth, the accommodation spaces G surrounding each of the first connection pads P1*a*. In an implementation, the first insulating layer P1*b* may be at a uniform level to provide a reference level for the plurality of first connection pads P1*a*, and by forming the first connection pads P1*a* that uniformly protrude in the third direction Z3 with the thickness t1 from the reference level provided by the first insulating layer P1*b*, the connection thickness of the first and second connection portions P1 and P2 electrically connected to each other through the conductive particles 51 on the first connection pad P1*a* may be uniformly formed in the third direction Z3, and accordingly, the appearance quality of the product may be improved. As such, the first insulating layer P1*b* may provide the base for the first connection portion P1, uniformly form the thickness t1 of the first connection pads P1*a* protruding from the first insulating layer P1*b*, and may also uniformly form the depth of the accommodation spaces G on the first insulating layer P1*b*. In an implementation, the thickness t1 of the first connection pads P1*a* and the depth of the accommodation spaces G may be measured relative to each other, e.g., the thickness t1 of the first connection pads P1*a* may be measured from the first insulating layer P1*b* forming the bottom of the accommodation spaces G, and the depth of the accommodation spaces G may be measured from the first connection pads P1*a*. In an implementation, the connection thickness of the first and second connection portions P1 and P2 including the first and second connection pads P1*a* and P2*a* and a conductive compression layer 50 between the first and second connection pads P1*a* and P2*a* may be uniform. In an implementation, the connection thickness of the first and second connection portions P1 and P2 is a dimension in the third direction, and may include the thickness t1 or a depth d of the first and second connection pads P1*a* and P2*a*, and the first and second connection pads P1*a* and P2*a* and the thickness of the conductive compression layer 50 between the second connection pads P1*a* and P2*a*. In an implementation, the thickness t1 or the depth d of the first and second connection portions P1 and P2 may be uniformly maintained in the first direction Z1 in which the main circuit board 100 and the flexible circuit board 200 extend, the thickness between a surface I1 of the main circuit board 100 opposite to the first connection pads P1*a* and a surface I2 of the flexible circuit board 200 opposite to the second connection pads P2*a* may be uniformly maintained, and accordingly, local protrusions may be removed or prevented throughout the exterior of the battery pack. In an implementation, the surface I1 of the main circuit board 100 and the surface I2 of the flexible circuit board 200 connected to each other may be flat, and thus, the overall appearance quality of the battery pack may be improved. In an implementation, components involved in the electrical connection between the main circuit board 100 and the flexible circuit board 200, e.g., the first and second connection pads P1*a* and P2*a* and the conductive compression layer 50 therebetween may be between the surface I1 of the main circuit board 100 and the surface I2 of the flexible circuit board 200, and as the connection thickness of the first and second connection portions P1 and P2 formed by the components is uniformly maintained, the surface I1 of the main circuit board 100 and the surface I2 of the flexible circuit board 200 may be flat. In an implementation, the surface I1 of the main circuit board 100 and the surface I2 of the flexible circuit board 200, which may form the exterior of the battery pack, may be respectively opposite to the first and second connection pads P1*a* and P2*a* forming an electrical connection therebetween, e.g., may have electrical insulation, and as such, as the surface I1 of the main circuit board 100 and the surface I2 of the flexible circuit board 200, which may form the exterior of the battery pack and thus be exposed to an external environment, may have electrical insulation, and a component for separately providing electrical insulation, such as an insulating tape, may be omitted.

Referring to FIG. 3, in an embodiment, the first insulating layer P1*b* on the first connection portion P1 may form an outer surface of the first connection portion P1 in the third direction Z3, e.g., a flat outer surface of the first connection portion P1. As used herein, the first connection pad P1*a* protruding from the first insulating layer P1*b* to a certain thickness t1 in the third direction Z3 may mean that the first connection pad P1*a* protrudes from the flat outer surface of the first connection portion P1 in the third direction Z3. The outer surface of the first connection portion P1 provided by the first insulating layer P1*b* provides a constant level across the first connection portion P1, e.g., a flat outer surface. In this sense, the first connection pads P1*a* protruding from the first insulating layer P1*b* may not correspond to the flat outer surface of the first connection portion P1.

In an implementation, the first connection pads P1*a* on the first connection portion P1 and spaced apart from each other in the first and second directions Z1 and Z2 may form an array, e.g., the first connection pads P1*a* may be arranged in a matrix pattern with two rows in the first and second directions Z1 and Z2, respectively. In an implementation, the first connection pads P1*a* may be in an array and spaced apart from each other in the first and second directions Z1 and Z2, to accommodate, in the accommodation spaces G adjacent to the first connection pads P1*a*, the insulating resin 52 discharged from the top of the first connection pads P1*a*, and to increase the opposing areas between the first and second connection pads P1*a* and P2*a* at corresponding positions, e.g., the opposing areas forming electrical connection or structural binding, e.g., increase the areas of the first and second connection pads P1*a* and P2*a* facing each other and strengthen electrical connection or structural binding between the first and second connection pads P1*a* and P2*a*, to effectively counter an external force that may act on the flexible circuit board 200, e.g., a tensile force that may act on the flexible circuit board 200 in the first direction Z1.

In an implementation, in order to obtain appropriate binding strength between the first and second connection pads P1*a* and P2*a* or the first and second connection portions P1 and P2 forming an electrical connection or structural binding between the main circuit board 100 and the flexible circuit board 200, the accommodation spaces G may be on the first insulating layer P1*b* between the first connection pads P1*a* such that the insulating resin 52 discharged from the first connection pads P1*a* may be accommodated in the accommodation spaces G. Thus, the electrical connection or the structural binding through the conductive particles 51 on the first connection pad P1a may not be hindered by any excess insulating resin 52 remaining on the first connection pads P1a. In order to secure an appropriate binding strength between the first and second connection pads P1a and P2a through the conductive particles 51 on the first connection pad P1a, the conductive particles 51 may be captured at a high density between the first and second connection pads P1a and P2a. In an implementation, the first and second connection pads P1a and P2a may be bound through the conductive particles 51 densely packed between the first and second connection pads P1a and P2a.

In an implementation, the first and second connection pads P1a and P2a may be in positions and may have shapes corresponding (e.g., complementary) to each other, and considering the binding strength between the first and second connection pads P1a and P2a for counteracting an tensile force acting through the external connection terminal T, the first and second connection pads P1a and P2a on the side close to the external connection terminal T in the first direction Z1 among the first and second connection pads P1a and P2a may extend relatively long in the first direction Z1, whereas the first and second connection pads P1a and P2a on the side far from the external connection terminal T in the first direction Z1 among the first and second connection pads P1a and P2a may extend relatively short in the first direction Z1.

Referring to FIGS. 3 to 4B, the first connection portion P1 of the main circuit board 100 may include the first connection pads P1a protruding to a certain thickness t1 from the first insulating layer P1b providing the accommodation spaces G, and the second connection portion P2 (electrically connected to the first connection portion P1 of the main circuit board 100 while facing the first connection portion P1) may include the second connection pads P2a protruding from a second insulating layer P2b of the flexible circuit board 200 or retracting or recessed from the second insulating layer P2b. In an implementation, the first connection portion P1 may include the first connection pads P1a protruding from the first insulating layer P1b to form the accommodation spaces G between the first connection pads P1a at a level lower than that of the first connection pads P1a. In an implementation, the second connection portion P2 may include the second connection pads P2a protruding from the second insulating layer P2b to the accommodation spaces G between the second connection pads P2a at a level lower than that of the second connection pads P2a In an implementation, the second connection portion P2 may include the second connection pads P2a recessed from or between the second insulating layer P2b to provide locking steps that help prevent separation of the conductive particles 51, through the second connection pads P2a, and may capture the plurality of conductive particles 51 at a high density between the first and second connection pads P1a and P2a.

In an implementation, the first connection portion P1 of the main circuit board 100 may include the first connection pads P1a protruding from the first insulating layer P1b, to provide the accommodation spaces G for accommodating the insulating resin 52 (the insulating resin 52 of the conductive compression layer 50) between the first connection pads P1a, and the second connection pads P2a coupled to the first connection pad P1a with the conductive particles 51 therebetween, unlike the first connection pads P1a, may be recessed from or relative to the second insulating layer P2b rather than to protrude from the second insulating layer P2b, and thus perform a function of a locking step preventing separation of the conductive particles 51 between the first and second connection pads P1a and P2a.

In an implementation, the main circuit board 100 may be a relatively hard rigid circuit board to stably support, through the first connection portion P1, the protruding first connection pads P1a having a relatively high thickness t1. In an implementation, the flexible circuit board 200 may be a relatively flexible circuit board and thus lack rigidity to stably support, through the second connection portion P2, the protruding second connection pads P2a having a relatively high thickness. Thus, the protruding first connection pads P1a having a relatively high thickness t1 may be in the first connection portion P1 having relatively sufficient rigidity, and the recessed second connection pads P2a having a relatively low thickness may be in the second connection portion P2 having relatively low rigidity. In an implementation, the first connection pads P1a may protrude from the first insulating layer P1b to a certain thickness t1, and may require a sufficiently rigid base for supporting the weight of the first connection pads P1a, and thus may be on the main circuit board 100 (corresponding to the first connection portion P1) having relatively sufficient rigidity. In an implementation, the second connection pad P2a may be exposed through openings P2' of the second insulating layer P2b, may be sufficient if it is exposed from the second insulating layer P2b forming the flat outer surface of the flexible circuit board 200, may not need to have a certain thickness for exposure from the second insulating layer P2b, and thus may be on the flexible circuit board 200 having relatively low rigidity.

In an implementation, the first and second connection pads P1a and P2a may face each other in the third direction Z3, and then electrically connected to each other through the conductive particles 51 by performing thermocompression bonding to press them in opposite directions. By pressing of the first and second connection pads P1a and P2a in opposite directions, e.g., by pressing the first and second connection pads P1a and P2a in opposite directions by using a pressing tool TO equipped with a heater, a high pressure may be formed between the first and second connection pads P1a and P2a, and the insulating resin 52 discharged from between the first and second connection pads P1a and P2a, at which the high pressure is formed, may be discharged toward the accommodation spaces G between the first connection pads P1a, and discharged from between the first and second connection pads P1a and P2a toward the accommodation spaces G between the first connection pads P1a corresponding to a lower position in the third direction Z3 in which gravity acts. In an implementation, by forming the first connection pads P1a at a relatively lower position in which the insulating resin 52 that has become fluid through the thermocompression bonding is easily discharged, to protrude to form a level difference from the accommodation spaces G in the thermocompression bonding of the first and second connection portions P1 and P2 or the first and second connection pads P1a and P2a, the discharged insulating resin 52 may be easily accommodated in the accommodation spaces G formed between the first connection pads P1a. In an implementation, the thermocompression bonding of the first and second connection portions P1 and P2 may be performed by placing the first connection portion P1 at a relatively lower position and the second connection portion P2 at a relatively upper position, and pressing, toward the first connection portion P1, the pressing tool TO, e.g., a heating plate, in contact with the second connection portion P2. Accordingly, heat transfer by the pressing tool TO, e.g., a heating plate, may be easily performed through the second connection portion P2 formed with a relatively low thickness (or the flexible circuit board 200 formed with a relatively low thickness), the pressing by the pressing tool TO such as a heating plate may be stably supported through the first connection portion P1 having a relatively high thickness (or the main circuit board 100 having a relatively high thickness). In an implementation, considering the flow direction of the insulating resin 52 according to the thermocompression bonding, the accommodation spaces G may be in the first connection portion P1 at a relatively lower position, and the relatively protruding first connection pads P1a may provide the accommodation spaces G. In an implementation, the first and second connection pads P1a and P2a may include the protruding first connection pads P1a and the retracting second connection pads P2a with respect to of the first and second insulating layers P1b and P2b, respectively. In an implementation, the first and second connection pads P1a and P2a may include the protruding first connection pads P1a and the protruding second connection pads P2a with respect to the first and second insulating layers P1b and P2b, respectively. However, even in this case, the insulating resin 52, which has become fluid due to the thermocompression bonding, may preferentially fill the accommodation spaces G between the first connection pads P1a, e.g., the accommodation spaces G at relatively lower positions, and thereafter, may fill the accommodation spaces G between the second connection pads P2a, e.g., the accommodation spaces G at relatively upper positions.

In an implementation, the first connection pads P1a may protrude to a certain thickness t1 from the first insulating layer P1b forming the outer surface of the main circuit board 100 in the third direction Z3, and the second connection pads P2a may be recessed to a certain depth d from the second insulating layer P2b forming the outer surface of the flexible circuit board 200 in the third direction Z3. In an implementation, the first and second insulating layers P1b and P2b, which provide a reference for the protruding thickness t1 or the retracting depth d of the first and second connection pads P1a and P2a, respectively, may correspond to components for forming a flat outer surface of each of the first and second connection portions P1 and P2, the first insulating layer P1b may include openings P1' at positions corresponding to the first connection pads P1a to facilitate electrical connections between the first connection pads P1a and the main circuit board 100, and the first connection pads P1a may protrude from the first insulating layer P1b to a certain thickness t1 through the openings P1' of the first insulating layer P1b. In an implementation, the first insulating layer P1b may be exposed only in the first connection portion P1 of the main circuit board 100, rather than being exposed throughout the main circuit board 100, and may extend from another part of the main circuit board 100 outside the first connection portion P1. In an implementation, the first insulating layer P1b may only be in the first connection portion P1 of the main circuit board 100, rather than being throughout the main circuit board 100, and thus may be advantageous for forming a locally flat outer surface. By maintaining high flatness, it is possible to provide the first connection pads P1a at a uniform level with respect to the first insulating layer P1b, and the accommodation spaces G at a uniform level.

The second insulating layer P2b may include openings P2' at positions corresponding to the second connection pads P2a such that the second connection pads P2a may be exposed from the second insulating layer P2b forming the outer surface of the flexible circuit board 200. In an implementation, the second connection pads P2a may be exposed from the outer surface of the flexible circuit board 200 through the openings P2' in the second insulating layer P2b. In an implementation, the second connection pad P2a may be recessed from the second insulating layer P2b by the depth d corresponding to the thickness of the second insulating layer P2b. In an implementation, the second insulating layer P2b may cover the second connection portion P2 and may extend to other parts of the flexible circuit board 200 than the second connection portion P2. In an implementation, the second insulating layer P2b may entirely cover the flexible circuit board 200. The second insulating layer P2b may not form the bottom of the accommodation space G, unlike the first insulating layer P1b, and it may not be necessary to maintain high flatness to provide a uniform depth d. In an implementation, the second insulating layer P2b may be only in the second connection portion P2 of the flexible circuit board 200, and may not extend to other parts of the flexible circuit board 200 than the second connection portion P2, and the second insulating layer P2b locally only in the second connection portion P2 may be advantageous for maintaining high flatness. In an implementation, the connection thickness between the first and second connection pads P1a and P2a may be uniform through the second connection pads P2a recessed at the uniform depth d with respect to the second insulating layer P2b.

In an implementation, the first and second connection portions P1 and P2 may be connected to each other to face each other with the conductive compression layer 50 therebetween. Accordingly, in the first and second connection portions P1 and P2, the first and second connection pads P1a and P2a bonded to each other may be on the sides facing each other among the main circuit board 100 and the flexible circuit board 200, and may be at positions facing each other. In an implementation, the first and second connection pads P1a and P2a may be at positions facing each other, and may not have a configuration in which one of the connection pads P1a and P2a exposes the other one of the connection pads P1a and P2a. In an implementation, the first and second connection pads P1a and P2a may be connected to each other through the conductive compression layer 50 therebetween, the shapes and arrangements of the first and second connection pads P1a and P2a may correspond to each other to completely overlap each other, and may increase the overlapping area. In an implementation, the first and second connection pads P1a and P2a may not be in a structure in which they are offset from each other or to have different areas and any one of the connection pads P1a and P2a exposes the other one of the connection pads P1a and P2a.

In an implementation, as illustrated in FIGS. 3 to 4B, the connection between the first and second connection portions P1 and P2 of the main circuit board 100 and the flexible circuit board 200 may be made through the conductive compression layer 50 between the first and second connection pads P1a and P2a substantially completely overlapping each other. In a comparative example illustrated in FIGS. 5 and 6 contrasted with the disclosure, the connection between first and second connection portions P1" and P2" of a main circuit board 100' and a flexible circuit board 200' may be made through soldering between first and second connection pads P1a' and P2a' formed such that one side may be exposed through the other side without partially overlapping each other. In the comparative example illustrated in FIGS. 5 and 6, the first connection pad P1a' on the first connection portion P1" may be recessed at a certain depth from the outer surface of the main circuit board 100' to be able to accommodate a soldering material 150, the second connection pads P2$a$' on the second connection portion P2' may be partially open to expose the first connection pads P1$a$', and a certain soldering thickness t5 may be on the second connection pad P2$a$ by applying the soldering material 150 from the second connection pads P2$a$' exposing the first connection pads P1$a$'. In the comparative example, when the soldering thickness t5 is on the first and second connection pads P1$a$ and P2$a$ overlapping each other, the soldering thickness t5 may not be regulated to a uniform size, and due to the deviation of the soldering thicknesses t5 formed on the first and second connection pads P1$a$ and P2$a$, the appearance quality may deteriorate. In the comparative example, an insulating tape may be attached to cover a plurality of soldering thicknesses t5 formed on a plurality of first and second connection pads P1$a$ and P2$a$, and as the deviation of the soldering thickness t5 is covered, creases or wrinkles could occur in the insulating tape, and accordingly, the appearance quality of the battery pack could deteriorate. In addition, in the comparative example, the soldering thickness t5 could be difficult to be controlled, the soldering thickness t5 could protrude relatively high, and accordingly, the overall volume of the battery pack could increase.

In an implementation, the first and second connection portions P1 and P2 may be connected to each other by performing thermocompression bonding on the first and second connection pads P1$a$ and P2$a$ with the conductive compression layer 50 therebetween, a series of components responsible for the electrical connection between the first and second connection portions P1 and P2 may be between the surface I1 of the main circuit board 100 opposite to the first connection portion P1 (the first connection pads P1$a$) and the surface I2 of the flexible circuit board 200 opposite to the second connection portion P2 (the second connection pads P2$a$) and may not be exposed from the surface I1 of the main circuit board 100 and the surface I2 of the flexible circuit board 200. Accordingly, a separate insulating tape may not be required to cover the soldering thickness t5 exposed as the soldering material 150 mediating the connection between the first and second connection pads P1$a$' and P2$a$' is exposed from the flexible circuit board 200', as in the comparative examples illustrated in FIGS. 5 and 6. In an implementation, as illustrated in FIGS. 4A and 4B, the first and second connection pads P1$a$ and P2$a$ responsible for the electrical connection between the main circuit board 100 and the flexible circuit board 200, and the conductive compression layer 50 between the first and second connection pads P1$a$ and P2$a$, may be between the surface I1 of the main circuit board 100 and the surface I2 of the flexible circuit board 200 respectively opposite to the first and second connection pads P1$a$ and P2$a$, and may not be exposed from the surface I1 of the main circuit board 100 and the surface I2 of the flexible circuit board 200. Accordingly, a separate insulating tape for covering the soldering thickness t5 exposed from the flexible circuit board 200' as in the comparative example illustrated in FIGS. 5 and 6 may be omitted. In an implementation, by performing thermocompression bonding on the first connection pads P1$a$ of the main circuit board 100 and the second connection pads P2$a$ of the flexible circuit board 200 with the conductive compression layer 50 therebetween for mediating the connection between the main circuit board 100 and the flexible circuit board 200, the electrical connection or structural bind may be formed between the main circuit board 100 and the flexible circuit board 200, and through thermocompression bonding, e.g., by adjusting the compression thickness of the processing tool TO such as a heating plate providing certain heat and pressure through thermocompression bonding or by adjusting the stroke of the processing tool TO such as a heating plate, the connection thickness between the main circuit board 100 and the flexible circuit board 200 (the sum of the thicknesses of the first and second connection pads P1$a$ and P2$a$ and the conductive compression layer 50 between the first and second connection pads P1$a$ and P2$a$) formed by the thermocompression bonding may be constantly controlled by controlling process conditions unlike the control of the soldering thickness t5 as in the comparative example illustrated in FIGS. 5 and 6. Thus, the connection thickness between the main circuit board 100 and the flexible circuit board 200 (the sum of the thicknesses of the first and second connection pads P1$a$ and P2$a$ and the conductive compression layer 50 between the first and second connection pads P1$a$ and P2$a$) may be precisely controlled, and accordingly, the surface I1 of the main circuit board 100 and the surface I2 of the flexible circuit board 200, which form the exterior of the battery pack, may be maintained to be flat, and the appearance quality of the entire battery pack may be improved. In an implementation, the connection thickness between the main circuit board 100 and the flexible circuit board 200 may be determined according to the thickness t1 or the depth d of the first and second connection pads P1$a$ and P2$a$ that is a dimension in the third direction, the diameter of the conductive particles 51 between the first and second connection pads P1$a$ and P2$a$ (e.g., corresponding to the thickness of the conductive compression layer 50 between the first and second connection pads P1$a$ and P2$a$), or the like. In an implementation, the connection thickness between the first and second connection pads P1$a$ and P2$a$ may be reduced through the conductive particles 51 in a monolayer between the first and second connection pads P1$a$ and P2$a$, and may not have a relatively prominent soldering thickness t5 from the flexible circuit board 200' due to the uncontrolled soldering thickness t5 as in the comparative example illustrated in FIGS. 5 and 6. In an implementation, the volume of the entire battery pack may be reduced through the connection thickness lower than the soldering thickness t5 of the comparative example.

According to the disclosure, a battery pack may have improved reliability of electrical connection between a main circuit board and a flexible circuit board forming charge and discharge paths of a battery cell, and allowing ease of such connection.

One or more embodiments may provide a battery pack having improved reliability of electrical connection between a main circuit board and a flexible circuit board forming charge and discharge paths of a battery cell, and allowing ease of such connection.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a battery cell;
a main circuit board electrically connected to the battery cell;
a flexible circuit board connected to the main circuit board and having an external connection terminal therein;
a conductive compression layer between a first connection portion of the main circuit board and a second connection portion of the flexible circuit board, the conductive compression layer:
electrically connecting the first connection portion and the second connection portion to each other, and
including a plurality of conductive particles and an insulating resin accommodating the plurality of conductive particles,
wherein:
the first connection portion of the main circuit board includes a first insulating layer, first connection pads protruding from the first insulating layer, and accommodation spaces on the first insulating layer, the accommodation spaces being between adjacent ones of the first connection pads and accommodating the insulating resin, and
the second connection portion of the flexible circuit board includes second connection pads electrically connected to the first connection pads.

2. The battery pack as claimed in claim 1, wherein:
the first connection pads are arranged in a first direction in which the main circuit board extends and arranged in a second direction intersecting the first direction, and
the accommodation spaces have a channel shape extending in the first direction and the second direction between adjacent ones of the first connection pads.

3. The battery pack as claimed in claim 2, wherein the accommodation spaces are open toward an outside of the first connection portion.

4. The battery pack as claimed in claim 2, wherein each of the first connection pads is surrounded by the accommodation spaces and isolated from other adjacent first connection pads.

5. The battery pack as claimed in claim 2, wherein:
the first connection pads protrude from the first insulating layer in a third direction intersecting the first direction and the second direction, and
the accommodation spaces are on the first insulating layer.

6. The battery pack as claimed in claim 1, wherein the first connection pads, the second connection pads, and the conductive compression layer electrically connecting the first connection pads and the second connection pads to each other are between a surface of the main circuit board opposite to the first connection pads and a surface of the flexible circuit board opposite to the second connection pads.

7. The battery pack as claimed in claim 6, wherein the surface of the flexible circuit board is electrically insulating.

8. The battery pack as claimed in claim 1, wherein the first connection pads protrude above the first insulating layer and penetrate the first insulating layer.

9. The battery pack as claimed in claim 8, wherein the first connection pads have a uniform thickness protruding from the first insulating layer.

10. The battery pack as claimed in claim 1, wherein the first insulating layer has a flat surface across the first connection pads.

11. The battery pack as claimed in claim 10, wherein the first insulating layer forms a flat outer surface of the main circuit board in a third direction intersecting the first direction in which the main circuit board extends, extends from a position outside the first connection portion in the main circuit board, and is locally exposed in the first connection portion.

12. The battery pack as claimed in claim 1, wherein the second connection pads are recessed from a second insulating layer in the second connection portion.

13. The battery pack as claimed in claim 12, wherein:
the second connection pads are recessed from the second insulating layer by a depth corresponding to a thickness of the second insulating layer, and
a depth of the second connection pads provides a locking step for capturing the plurality of conductive particles between the first connection pads and the second connection pads.

14. The battery pack as claimed in claim 12, wherein the second connection pads are exposed through openings of the second insulating layer.

15. The battery pack as claimed in claim 1, wherein:
the main circuit board and the flexible circuit board overlap each other at the first connection portion and the second connection portion in a first direction, and extend side by side with each other in the first direction, and
the first connection pads and the second connection pads, in the first connection portion and the second connection portion, are arranged in the first direction and a second direction intersecting the first direction.

16. The battery pack as claimed in claim 1, wherein, among relative proportions of the plurality of conductive particles and the insulating resin of the conductive compression layer, a relative proportion of the plurality of conductive particles between the first connection pads and the second connection pads in the first connection portion and the second connection portion, respectively, is greater than a relative proportion of the plurality of conductive particles in the accommodation spaces.

17. The battery pack as claimed in claim 1, wherein, among relative proportions of the plurality of conductive particles and the insulating resin of the conductive compression layer, a relative proportion of the insulating resin in the accommodation spaces is greater than a relative proportion of the insulating resin between the first connection pads and the second connection pads in the first connection portion and the second connection portion, respectively.

* * * * *